United States Patent [19]

Vertut

[11] 4,244,296
[45] Jan. 13, 1981

[54] SELF-PROPELLED VEHICLE

[75] Inventor: Jean Vertut, Issy-Les-Moulineaux, France

[73] Assignee: Commissariat a l'Energie Atomique, France

[21] Appl. No.: 877,885

[22] Filed: Feb. 15, 1978

[30] Foreign Application Priority Data

Feb. 24, 1977 [FR] France .................................. 77 05410

[51] Int. Cl.$^3$ ............................................. B61B 13/10
[52] U.S. Cl. ............................ 104/138 G; 15/104.05;
73/40.5 R; 105/365; 250/358 P;
15/104.03;104.05;104.3 R
[58] Field of Search ....... 104/138 R, 138 G, 118–120;
105/365; 254/134.5; 134/166 C, 168 C, 167 C,
169 C; 250/358 P; 72/466; 73/40, 40.5 R, 40.5
A; 33/1 H, 178 F; 118/105, 254, 306, 317, 408,
622, DIG. 10

[56] References Cited

U.S. PATENT DOCUMENTS

| 2,975,637 | 3/1961 | Burdick | 73/40.5 R |
| 2,985,114 | 5/1961 | Lindner | 104/118 |
| 3,606,862 | 9/1971 | Huff et al. | 118/306 |
| 3,979,941 | 9/1976 | Auxer | 104/138 G |
| 4,034,679 | 7/1977 | Gaither et al. | 104/138 R |

FOREIGN PATENT DOCUMENTS

| 1084801 | 7/1960 | Fed. Rep. of Germany | 104/138 R |
| 1238499 | 7/1960 | France | 104/23 FS |

Primary Examiner—John J. Love
Assistant Examiner—Ross Weaver
Attorney, Agent, or Firm—Thomas J. Greer, Jr.

[57] ABSTRACT

Self-propelled vehicle with articulated arms able to move in a tube or in a laminar space defined between two approximately parallel surfaces. It comprises a body equipped with at least one driving and guide wheel which bears on a surface on which the vehicle moves and at least two pivoting arms articulated on the body and terminated by bearing members which slide or roll on a surface facing and opposite to the first surface. It also comprises a device which transmits a pivoting torque to the arms in such a way that said arms bear on said opposite surface and by reaction apply the driving wheel against the first surface. A particular application is to the inspection of pipes within a nuclear installation in a radioactive atmosphere.

15 Claims, 14 Drawing Figures

SELF-PROPELLED VEHICLE

BACKGROUND OF THE INVENTION

The present invention relates to a self-propelled vehicle with articulated arms which, whilst overcoming any obstacles which may be encountered, is able to move through a tubular member whose configuration can be variable according to its length and/or diameter, or between two not necessarily parallel surfaces which are separated by a relatively small distance and particularly, but not exclusively, in pipes for supplying a cooling fluid to the core of a nuclear reactor or in the space separating the vessel of the latter from a second parallel vessel, which duplicates the first and serves as a safety vessel.

The problem of the displacement within a tube or narrow space defined between two walls of remotely controlled inspection or repair devices is of particular importance in the case of nuclear installations located in radioactive environments. In the case of small diameter tubes it has already proved possible to move television cameras at the end of their supply cable when the path to be taken only has curves or obstacles of limited dimensions. However, if the tubes have an adequate diameter the most simple solution consists of authorising the passage of a man, which is only possible if the ambient activity is within the accepted limits. However, if the activity is high and if the passage to be taken is too vertical or has pronounced obstacles or bends the only possibility consists of using a remotely controlled, self-propelled vehicle.

BRIEF SUMMARY OF THE INVENTION

The present invention relates to such a vehicle which is designed to travel both in a tube and in a lamina narrow space, whilst being able to pass round obstacles which would normally prevent the movement of the vehicle, said obstacle being constituted for example by projections such as temperature recording means or to areas where the wall is missing, particularly in the vicinity of junctions, tappings, etc., whereby the space or tube traversed by the vehicle may also have vertical areas and/or relatively large and sudden changes of cross-section.

To this end the vehicle comprises a body equipped with at least one driving and guide wheel which bears on a surface on which the vehicle travels and at least two pivoting arms articulated to the body and terminated by two supporting members which slide or roll on a surface which faces and is opposite to the first surface, and a device which transmits a pivoting torque to the arms in such a way that they bear on said opposite surface and by reaction cause the application of the driving wheel to said first surface.

BRIEF DESCRIPTION OF THE DRAWINGS

Other features of a self-propelled vehicle with articulated arms according to the present invention can be gathered from the following description of non-limitative embodiments and with reference to the attached drawings, wherein show.

DETAILED DESCRIPTION OF THE PREFERRED EMBODIMENTS

Figure 1A:
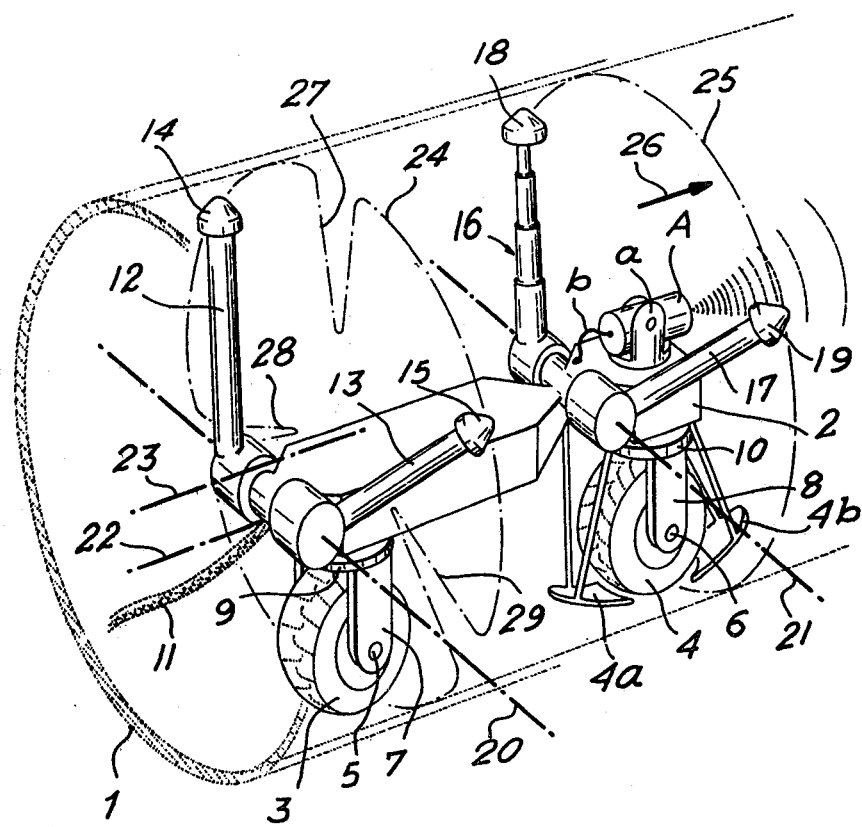
FIGS. 1a and 1b in part perspective the self-propelled vehicle in question according to two first varients, more particularly suitable for the movement of the vehicle within a tube having a substantially circular cross-section.

In the embodiment of FIG. 1a the self-propelled vehicle according to the invention is suitable for movement within a tube 1, whose cross-section is normally circular. However, said tube can have obstacles to the travel of the vehicle, said obstacles being constituted by tappings and/or increases or decreases in the cross-section, as well as bent portions with changes of orientations and particularly vertical portions, as will be described hereinafter. The self-propelled vehicle shown within tube 1 has a body 2, which in the present embodiment is supported by two wheels 3, 4 which are advantageously both driving and guiding, whereby the vehicle can be moved by a single driving wheel. Each of the wheels is supported by a transverse shaft 5, 6, carried by forks 7, 8 located beneath the vehicle body as an extension of orientation rings 9, 10 making it possible to pivot the wheels about substantially parallel axes substantially perpendicular to body 2. Wheels 3, 4 are rotated and pivoted via motors (not shown in this drawing) and in conventional manner are supplied with energy by a connection 11 which uncoils in proportion to the movement of the vehicle within tube 1.

According to the invention body 2 supports articulated arms which in the present embodiment are distributed on the basis of two pairs of arms associated with each of the wheels 3 and 4. Arms 12 and 13 of the first pair have at their ends opposite to those articulated to body 2 sliding or rolling supporting members 14, 15 which are able to come into contact with the inner wall of tube 1 in order to ensure the balance of the vehicle, the constructional form of said members being defined hereinafter. In the same way arms 16, 17 of the second pair have supporting members 18, 19. Arms 12, 13 on the one hand and 16, 17 on the other are articulated in pairs about two substantially parallel transverse axes 20, 21 which, in the present embodiment, extend perpendicularly to the longitudinal axis 22 of body 2, whereby axis 22 can coincide or be slightly staggered relative to axis 23 of tube 1. Each pair of arms is associated with not shown torque generating members able to bring about the rotation of the arms in independent manner in order to engage the supporting members associated with these arms against tube 1. The reaction on the wall of the tube exerts a resulting quantity on the driving and guide wheels 3, 4, causing their application to tube 1 opposite to the preceding members. If appropriate each of the above arms can be assembled telescopically, such as for example arm 16 shown in FIG. 1a.

Advantageously wheel 3 and supporting members 14, 15 of the first pair of arms on the one hand and wheel 4 and supporting members 18, 19 of the second pair of arms on the other hand in each case materialise three support points on the inner surface of tube 1 distributed according to two close sections of large parallel circles 24, 25, whilst maintaining the axis 22 of body 2 in a plane of symmetry of the tube. In FIG. 1 arrow 26 indicates the direction of movement of the vehicle, whereby the latter carries appropriate inspection or checking means, such as for example a television camera A articulated to a pivotal support a and energised by an electric cable b which, as the vehicle advances within the tube 1, is able to remotely retransmit to the outside the corresponding images. Furthermore the vehicle equipment can be supplemented by any accessory which is suitable for its use, for example a rotary, high pressure decontaminating jet placed at the front of the vehicle and which decontaminates the tube as the vehicle advances, or a remote manipulator arm which is able to carry out various tasks within the tube.

As has been stated hereinbefore the supporting members and driving and guide wheels of the vehicle are distributed in accordance with two close sections of large circles 24, 25 of tube 1 and are maintained in this position during the advance of the vehicle. However, it is readily apparent that due to the articulation of the arms and their association with an appropriate torque generating device said arms can easily move out of these large circles, particularly when the tube 1 has a deformation, for example when traversing a bend or during a variation in its diameter. In this hypothesis the supporting members are moved out of the planes containing the above-mentioned close sections of large circles, whilst moving away by a limited distance which enables the vehicle balance to be maintained, whereby axis 22 of body 2 remains parallel with axis 23 or, if appropriate, coincides with the latter. Under these conditions whilst wheels 3 and 4 remain in a plane containing axis 23 of tube 1 the vehicle will move in a plane which is diametrical to said tube. However, if in a desired or undesired manner the plane of one of the wheels, for example wheel 3 is rotated this leads to a helical movement for the triangle formed by said wheel and the two associated bearing members 14, 15, which would cause a twisting of the vehicle if the second wheel 4 was not simultaneously rotated by the same angle. Therefore the vehicle continues its helical trajectory about axis 23 until the wheels 3 and 4 return to the initial longitudinal plane. The self-propelled vehicle according to the invention is thus capable of two degrees of freedom of displacement in the tube, corresponding to a translation and to a rotation about the tube axis, the flexible maintaining of the bearing force of the members carried by the end of the articulated arms making it possible for the vehicle to adapt without difficulty to variations of diameter and to bends. Moreover it is possible either to avoid wall openings constituted for example by connecting tappings where a bearing member would lose contact, or if this occurs to detect the abnormal angle of the arm and control its bending until the opening has been traversed.

Moreover the possibility of folding the articulated arms along the body 2 or into any other intermediate position makes it possible for the vehicle to clear all obstacles which are liable to occur during its passage through the tube 1. The shape of the vehicle is selected in such a way that it can clear in the correct orientation any obstacle, constituted for example by projections 27, 28, 29 which are at an angle of 120° about axis 23 towards the inside of the tube and which may be in the form of speed or heat pick-ups and between which the vehicle and its arms can consequently engage without any risk of being blocked. Advantageously wheels 3, 4 are associated with shoe-carrying stirrups carried by body 2 and positioned in front of and behind the wheels in order to assist the vehicle when passing over holes or taps made in tube 1 having a diameter greater than that of the wheels. In order not to overload the drawing FIG. 1 only shows shoe-carrying stirrups 4a and 4b of wheel 4.

Figure 1B:
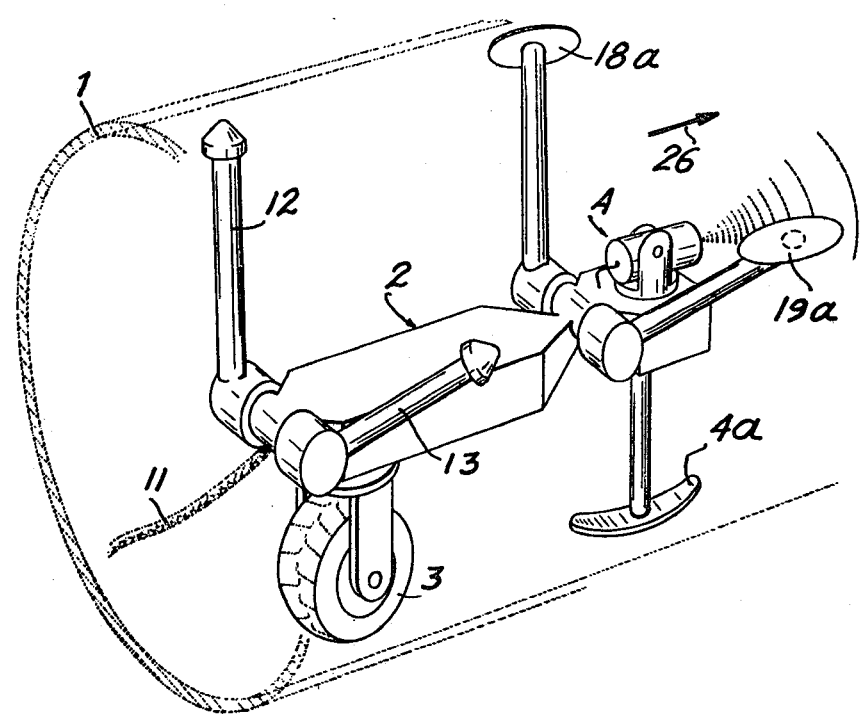

FIG. 1b illustrates a simplified variant of the above vehicle which only has one guide wheel 3 associated with two bearing arms 12, 13. At the opposite end of body 2 are provided three arms at an angle of approximately 120° having shoe-carrying stirrups such as 4a, 18a, 19a which merely ensure the centering in tube 1. The stirrups are such that they cannot cease to bear as a result of an opening in tube 1, such as an angle tapping. Thus, when the arms are fixed the shoe-carrying stirrups ensure an approximate centering and just fit in to the minimum cross-section. In the case where the arms are movable they provide as hereinbefore a constant support.

Figure 2:
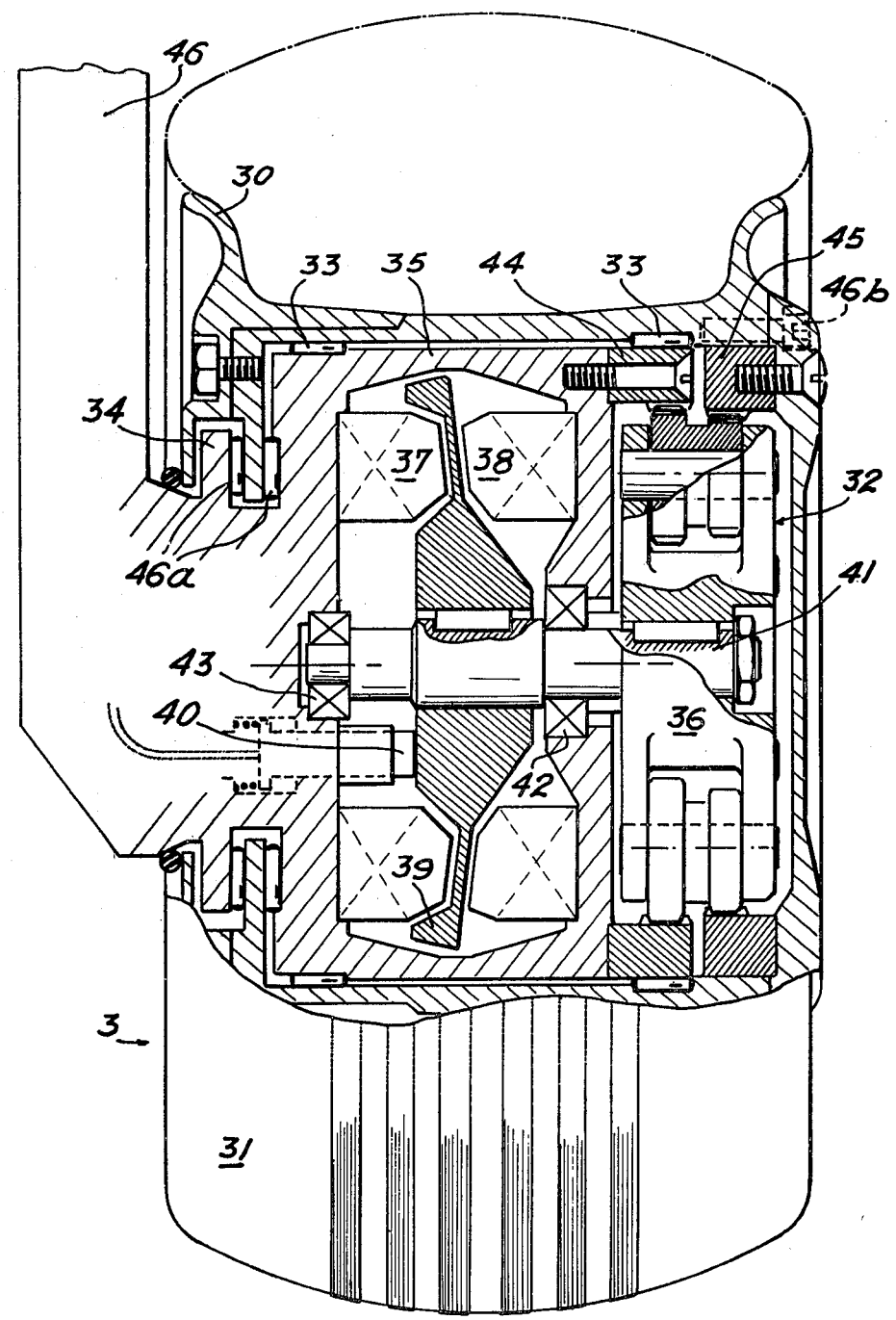
FIG. 2 a larger scale sectional view illustrating the detail of the driving and guide wheel.

FIG. 2 shows in cross-section an embodiment of a driving wheel, for example wheel 3 having a reduction gear in its hub. In this drawing it is possible to see that the rim 30 of the wheel carries a solid tire 31 and rotates about a hub 32 on needle bearings 33.

Hub 32 is constituted by a supporting member 34 screwed to the casing 35 of a flat motor, which itself carries a known epicyclic concentric reduction gear 36. This motor has permanent magnets 37, 38 between which rotates a coiled disc 39 energised by brushes 40. Shaft 41 of the motor, carried by bearings 42, 43 in the casing, supports the keyed rotor of the reduction gear 36. A fixed ring 44 is screwed to the casing 35 and a movable ring 45 is fixed to the rim 30 of wheel 3. A fork 46 supports member 34 of the hub and contains the electrical supply leads of the motor. Finally stops 46a ensure the lateral setting of the rim and screws such as 46b permit disassembly. Wheel 3 is pivoted by another flat reduction gear (not shown) in the same way as for its rotation control.

As stated hereinbefore it is advantageous for the bearing members provided at the end of the articulated arms and directed towards the inner surface of the tube to be set up so as to permit a swivelling movement on themselves in order to ensure their operation, no matter what the angular position of the corresponding arm relative to the tube axis, said position varying on traversing certain obstacles or as a result of a momentary displacement of wheels 3 and 4.

Figure 3A:
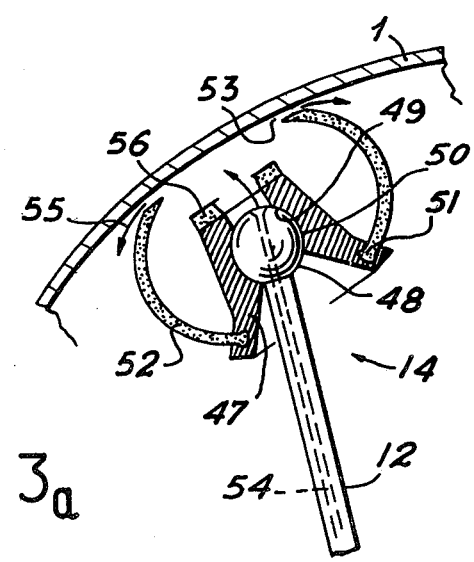
FIGS. 3a, 3b and 3c in larger scale sectional form detailed construction according to three different embodiments of members mounted at the end of the articulated arms of the vehicle to ensure bearing against the inner surface of the tube in which said vehicle is moving, FIG. 3c illustrating the detail of one of the members for pivoting an arm.

FIG. 3a illustrates a first embodiment of the bearing members, for example 14, provided at the end of arm 12. As can be seen in this drawing arm 12 has a terminal shoe 47 fixed to the arm by fitting between a spherical portion 48 integral with the arm and a housing 49 provided in shoe 47. The limited clearance 50 left between sphere 48 and housing 49 permits a swivelling of shoe 47 without any friction on the end of the arm. Shoe 47 also has a groove 51 on its outer surface permitting the fitting of a flexible skirt 52 whose edge 53 is applied in the vicinity of the inner wall of tube 1. The assembly is permanently supplied with pressuried fluid, generally air or argon depending on the nature of the environment in the tube, fed in by a bore 54 provided axially in arm 12 and permitting the formation of a fluid cushion which supports the end of articulated arm 12. The flow rate in bore 54 provided in the axis of arm 12 is regulated so as to ensure a constant leakage flow in the direction of arrows 55 between the inner wall of tube 1 and the edge 53 of skirt 52. Under these conditions transverse friction of the bearing member 14 is reduced to a very low value which, when the vehicle moves, only causes a negligible reaction on the rotation of the arm and consequently leads to no risk of jamming. Conversely if the fluid flow in bore 54 is stopped bearing member 14 bears against the inner surface of tube 1 after crushing the flexible skirt 52, whilst bringing about the application of a high friction bearing member 56, for example of rubber, which comes into contact with the wall of tube 1 and causes, as a function of the movement direction, a pivoting of the arm in the sense of jamming the assembly and stopping the vehicle.

Figure 3B:
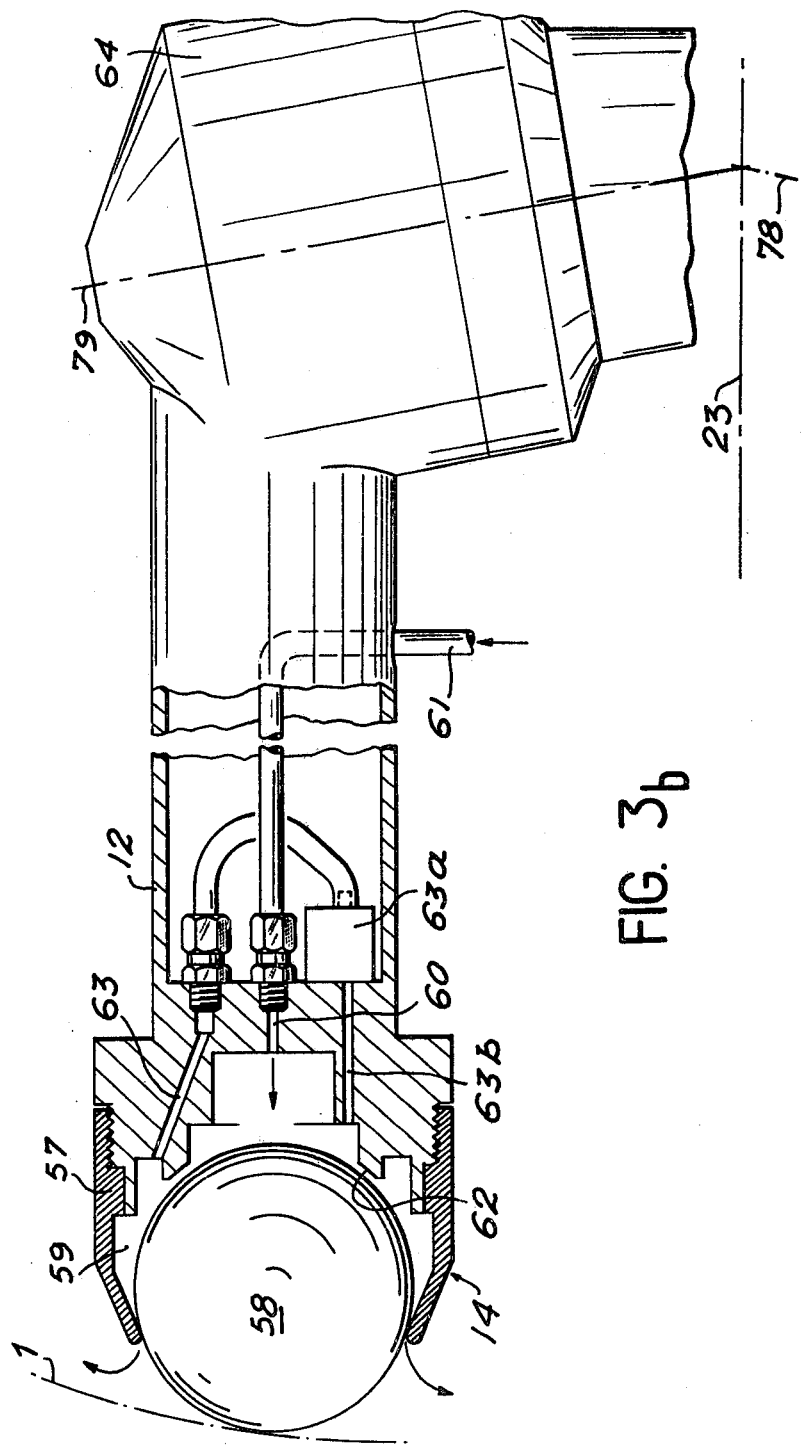
Figure 3B:
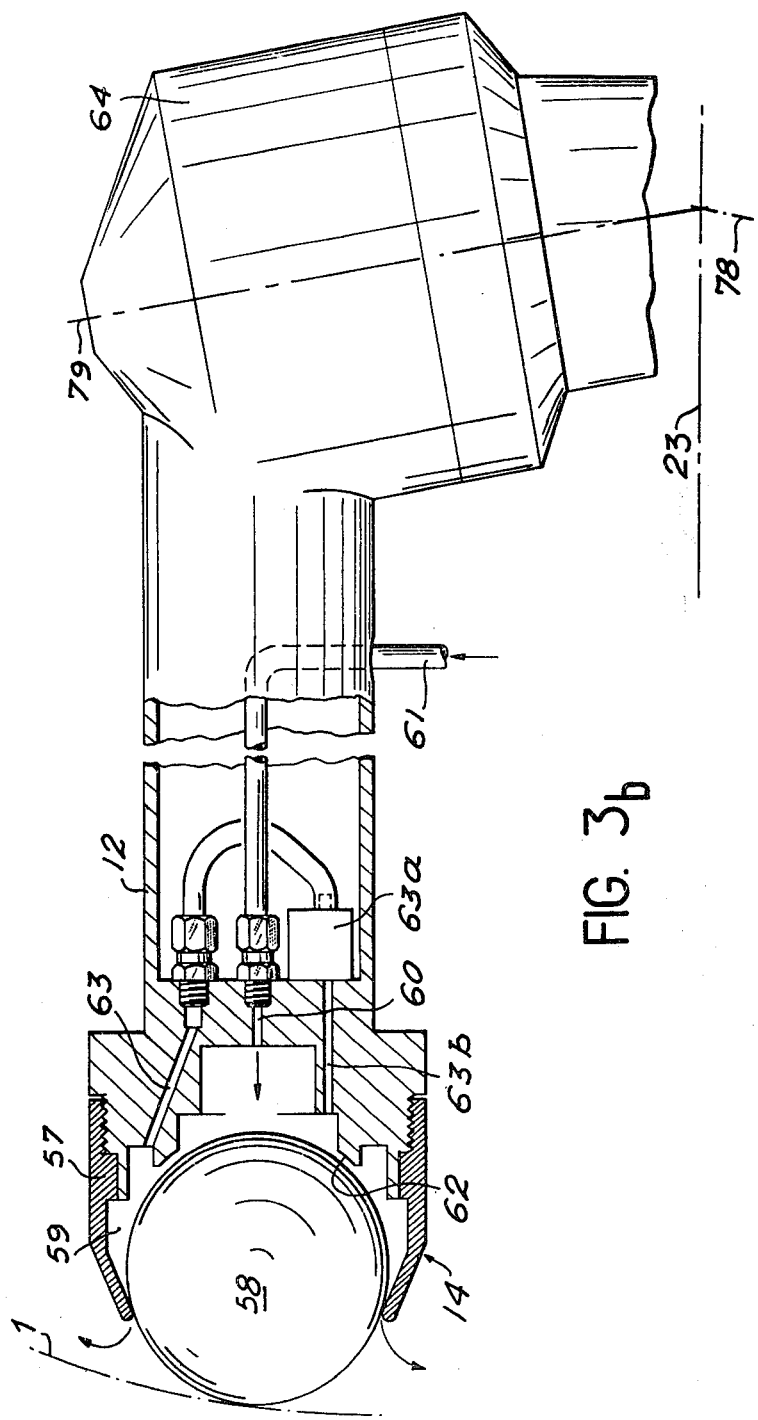

FIG. 3b illustrates another variant with respect to the bearing member 14 provided at the end of arm 12. In this variant the end of the arm is in the form of an open socket 57 within which is fitted a sphere 58 made from metal or an elastomeric material which defines with the inner surface of socket 57 a space 59. A pressurised gas is blown into space 59 by a bore 60 and a tube 61 provided in the axis of arm 12 so as to permit the application of sphere 58 to the inner surface of the inner tubular member 1. The space 59 between sphere 58 and its location in socket 57, as well as the space between a seat 62 and said sphere 58 ensure frictionless bearing surfaces on gaseous cushions. In the case of loss of contact between sphere 58 and the wall of tube 1, the latter seals the housing of socket 57, whereby the pressure rise in said socket makes it easily possible to detect the incident by an appropriate measurement carried out by a tube 63 and a detector 63a. A bearing pressure excess brings about the contact of the sphere with the bearing surface 62, detected by the differential pressure between tube 63 and 63b. Finally if the blowing in of air is discontinued the sphere bears with friction onto tube 1 and its seat 62, whilst bringing about a pivoting of the arm and the stoppage of the vehicle, as in the previous embodiment.

Figure 3C:
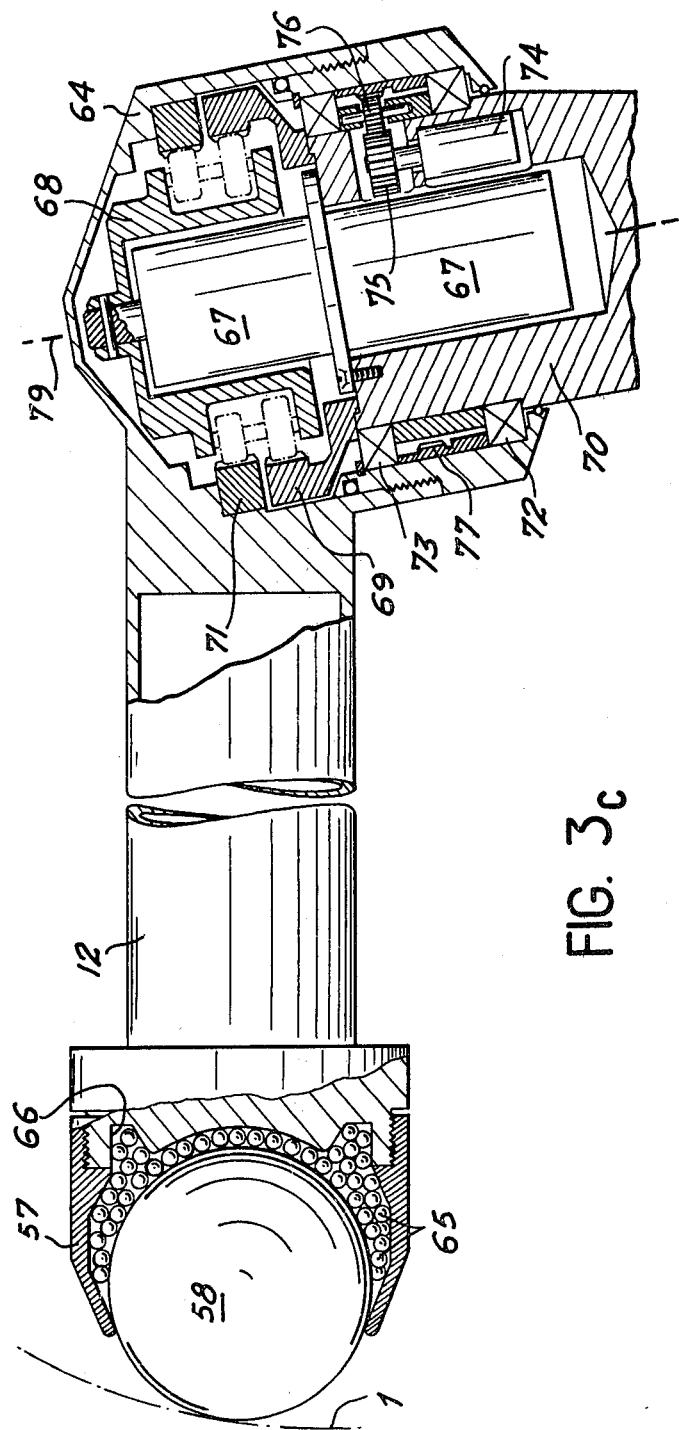
Figure 3C:
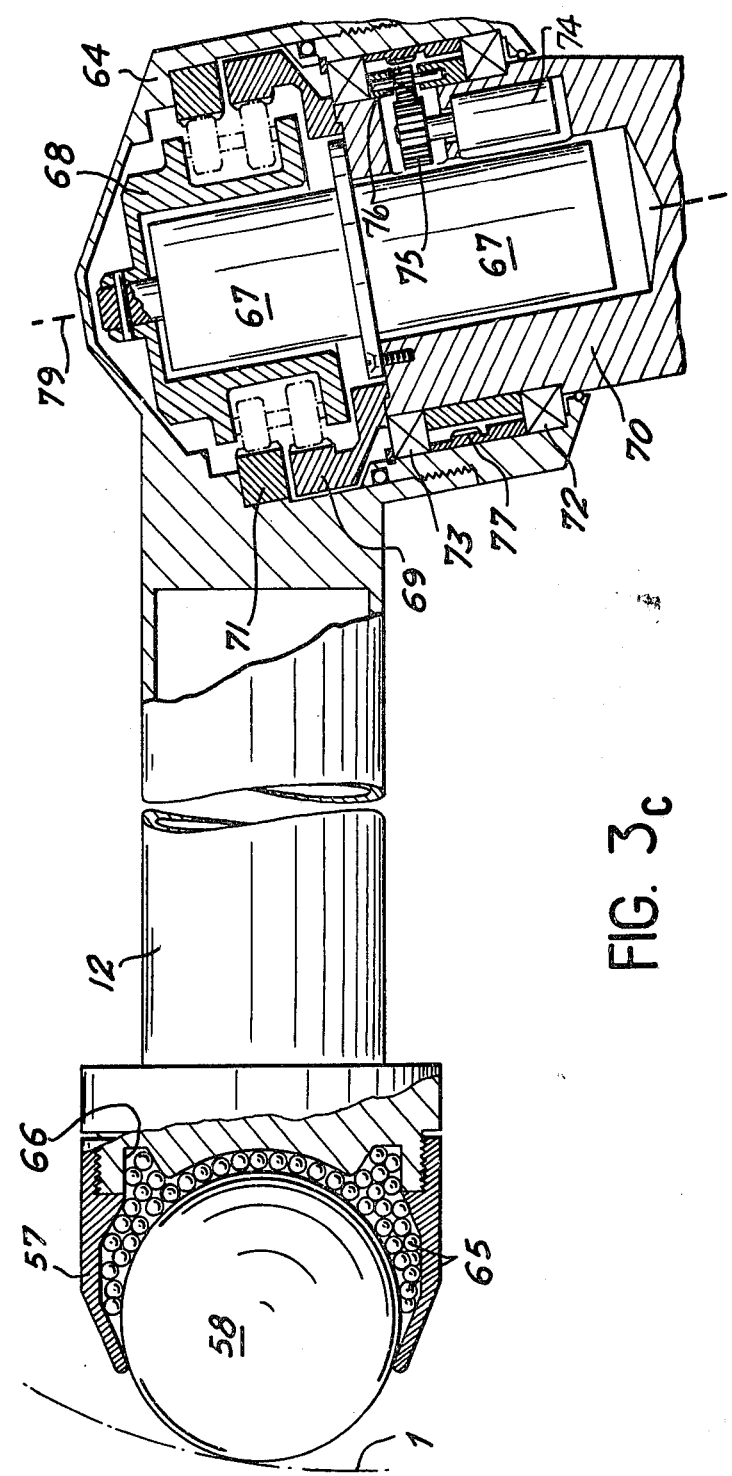

The two embodiments of the fluid cushion bearing members according to FIGS. 3a and 3b correspond to variants where the arm is pivoted by means of rotary jacks (not shown) acting on a support 64 (FIG. 3b) carrying each of its arms. FIG. 3c illustrates another mechanical variant where the sphere 5 rolling against tube 1 is carried by a ball cap or shell 65 in accordance with a known system, whereby the groove 66 on the periphery of socket 57 gives the balls a free circulation path during the rotations of sphere 58. The control of arm 12 for example is shown here in a variant with an electrical reduction gear and motor mounted in support 64. Motor 67 drives a rotor 68 of an epicyclic concentric flat reduction gear of the type already used for controlling the wheels and whose fixed ring 69 is integral with hub 70. The movable ring 71 is integral with support 64 carrying the arm. The latter pivots on bearing 72, 73 carried by hub 70. The angular position of arm 12 is transmitted to a control cubicle (not shown) by a potentiometer 74. The latter is driven by a pinion 75 bearing on its axis and meshing with a pinion 76 whose own axis is integral with hub 70, which meshes with a ring 77 provided in the tight support 64 which carries the arm. Thus, the bearing of the arm caused by such a reversible reduction gear is proportional to the current flowing in the motor, which brings about the elastic support necessary for the operation of the vehicle.

Figure 4:
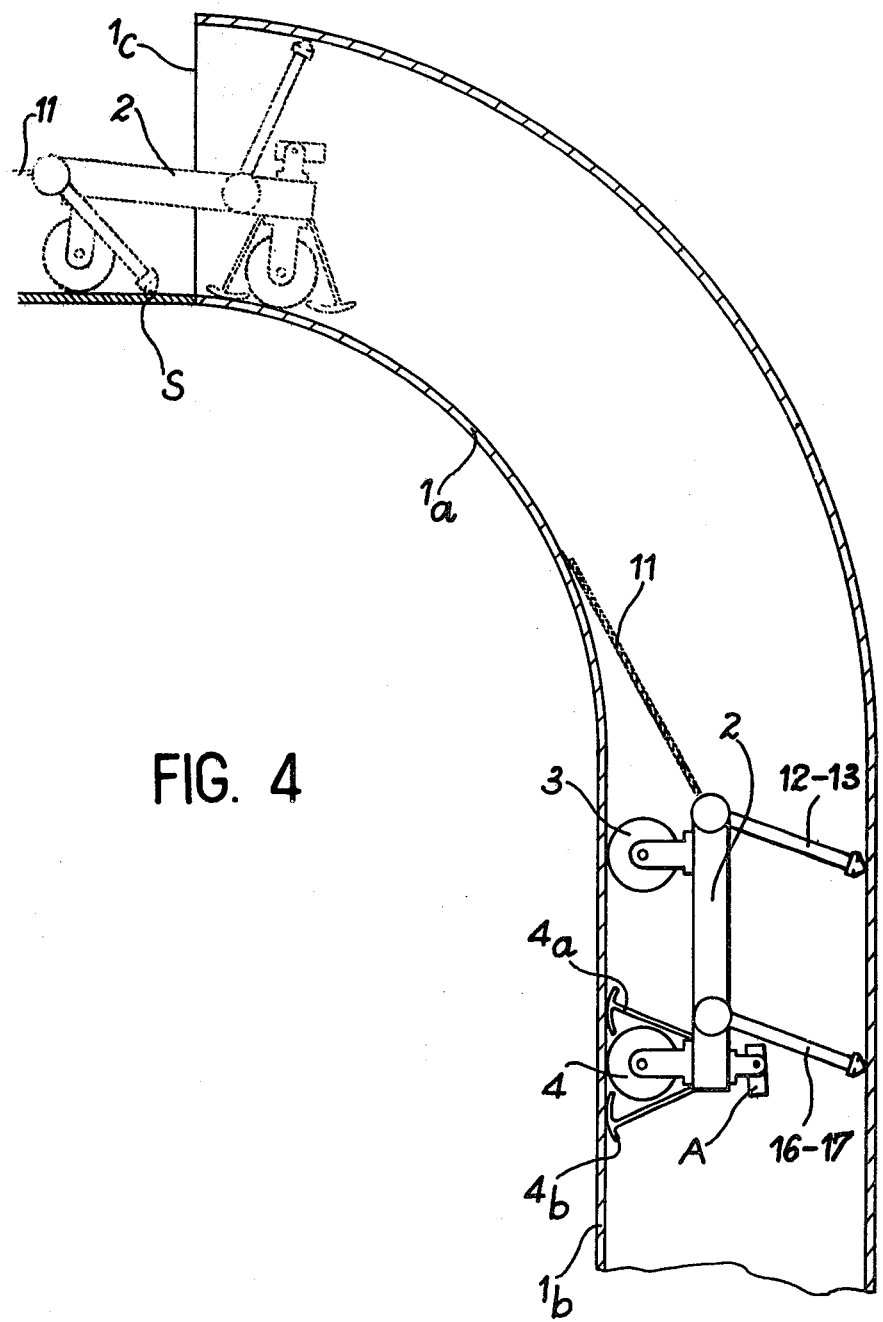
FIG. 4 a smaller scale longitudinal sectional view of the tube in which the vehicle moves in an area having a bend and a vertical portion.

FIG. 4 shows an area of tube 1 of the previous drawings having a bend 1a and a vertical portion 1b. The self-propelled vehicle according to the invention described hereinbefore is shown in continuous lines within tube 1 in the vertical portion 1b and by dotted lines on entering bend 1a. Articulated arms 12 and 13 on the one hand and 16 and 17 on the other are shown as coinciding. In the first case the special construction of the bearing members provided at the end of the articulated arms permits, due to the interruption of the inflow of air, the transformation thereof into friction pads in order to prevent the vehicle from sliding downwards on the vertical line in such a way that the displacement between the articulation axis of said arms and that of the driving wheels spontaneously causes the jamming of the vehicle. In said same position if the driving wheels 3 and 4 move in the same rising direction and if the blowing in of air onto the pads of the articulated arms is discontinued the distribution of the angles of said arms will be such that any downward movement will cause an increasing bearing and increased jamming, which will thus contribute to the safety of the vehicle and will permit its pulling by means of its own cable 11 if the driving wheels stop operating. Obviously in the above position the elastic bearing torque of the different arms will in normal operation permit the obtaining of an adequate pressure on driving wheels 3 and 4 to permit the vehicle to be propelled along the vertical line in both the upwards and downwards directions.

In the indicated position of the arms it should be noted that on return jamming is impossible because if one arm is folded out by loss of contact in an opening of the wall, said arm will be lowered again when the opening is passed. Thus, by means of cable 11 it is always possible to remove a broken down vehicle, whose springs or the like (not shown) permanently ensure the bearing of the arms on the wall of tube 1.

FIG. 4 also shows the self-propelled vehicle when it enters section 1c of tube 1. Due to the lowering of the articulated arms, for example arms 12, 13, leading to the bearing of the latter on floor S it is clear that it is possible to progressively introduce the vehicle into the tube, whereby the two other arms 16, 17 then come into contact with the inner wall of the tube. After an appropriate penetration the lowering of arms 12, 13 again ensures the overall equilibrium of the assembly, through assuming the normal position corresponding to that illustrated in FIG. 1.

In all cases it should be noted that as the bearing reaction on the members provided at the end of the arms is applied in the direction of the centre of the tube it is important for the arms to be articulated as close as possible to the longitudinal axis 23 of the tube in order to prevent bending stresses resulting from the bearing thereof, whilst as far as possible limiting the same to a compressive force.

Figure 5A:
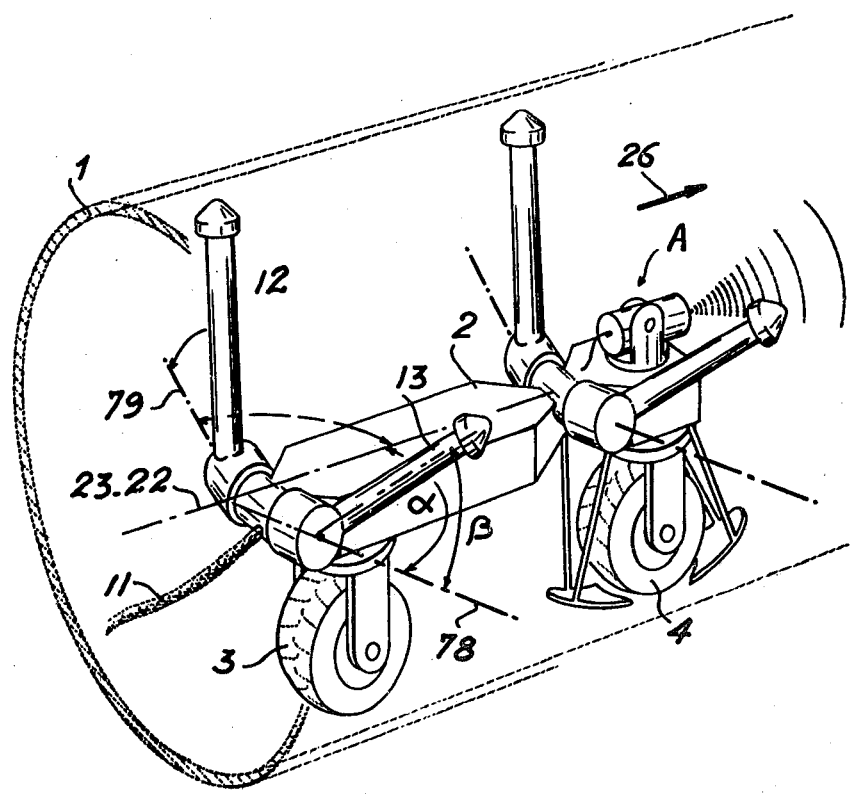
FIGS. 5a and 5b respectively perspective and front views of another constructional variant of the vehicle according to FIG. 1.
Figure 5B:
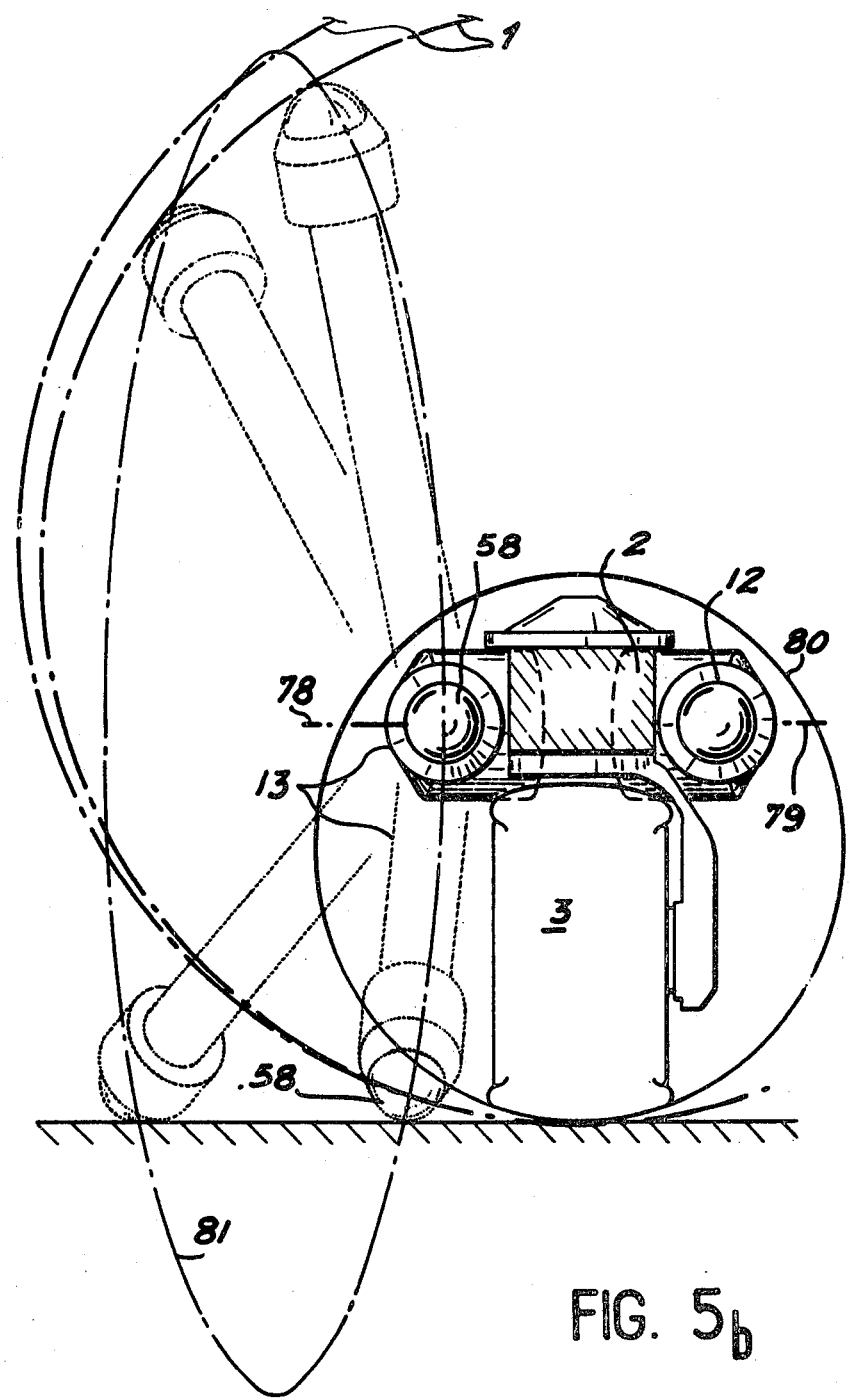

It should also be noted that in the arrangement illustrated in FIG. 1a when the articulated arms are brought into a horizontal plane the total width of the vehicle is less than that corresponding to the diameter of the tube, but still has significant overall dimensions. Thus, it may be necessary to still further reduce the passage cross-section of the vehicle by orienting the pivot axes of its arms so as to further reduce the overall dimensions of the vehicle in the folded-up position. Such a constructional variant is illustrated in FIGS. 5a, 5b, and 5c in which the arms, namely 12 and 13, pivot from two different axes 78, 79, both inclined relative to axis 22 of the vehicle (FIG. 5a) by a same angle α, the arms forming respectively an angle β which is equal to or smaller than α with their pivot axis. Thus, in the bearing position during the advance of the vehicle within the tubular member the operation of said vehicle remains identical to that described hereinbefore. However, in the folded position and in particular when the arms are placed along body 2 the passage cross-section necessary for the vehicle is considerably reduced and is indicated in FIG. 5b by the circle 80. In FIG. 5b attention is drawn to the ellipse 81 which represents the projection of the circle traversed by the contact point of the support sphere 58 (with balls or fluid cushion) during the conical travel of arm 13.

It is also possible to see in this drawing the mixed line curves 1 representing the normal cross-section of the tube and the maximum bearing section in a curve of said tube.

In the preceding constructional variant is should be noted that the articulated arms of the vehicle intercept the plane of the contact circles in accordance with radii close to 120°, thus only ensuring the indispensable reactions even in the curves of tube 1. The bearing of the sliding members provided at the end of these arms passes close to the pivoting axes which prevents bending stresses, with the exception of the torque necessary for ensuring the bearing of said members.

As a result of the improved variant according to FIG. 5 the vehicle is able to pass through a manhole of reduced diameter (e.g. 400 mm) and pass through a pipe (of diameter 800 mm). In general these dimensions correspond to those of the pipes of a primary circuit of a nuclear reactor.

Figure 6A:
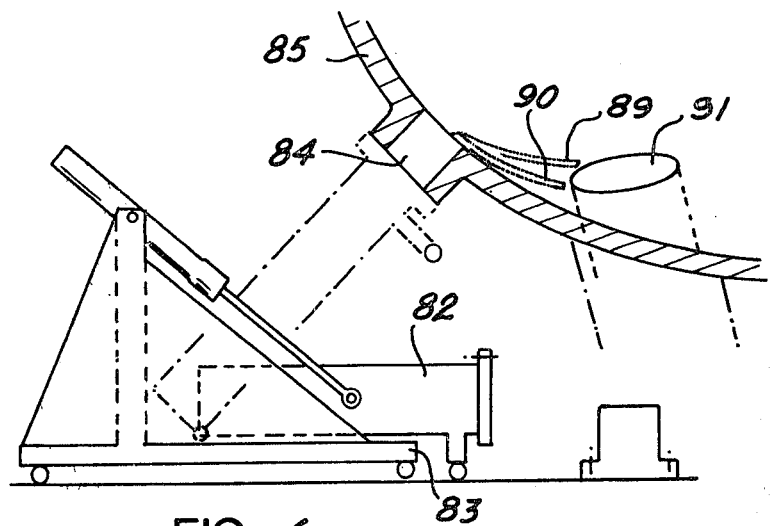
FIGS. 6a, 6b, 6c and 6d by means of a sequence of successive operations show how the vehicle can be introduced into a tubular duct, particularly the primary duct of a steam generator.
Figure 6B:
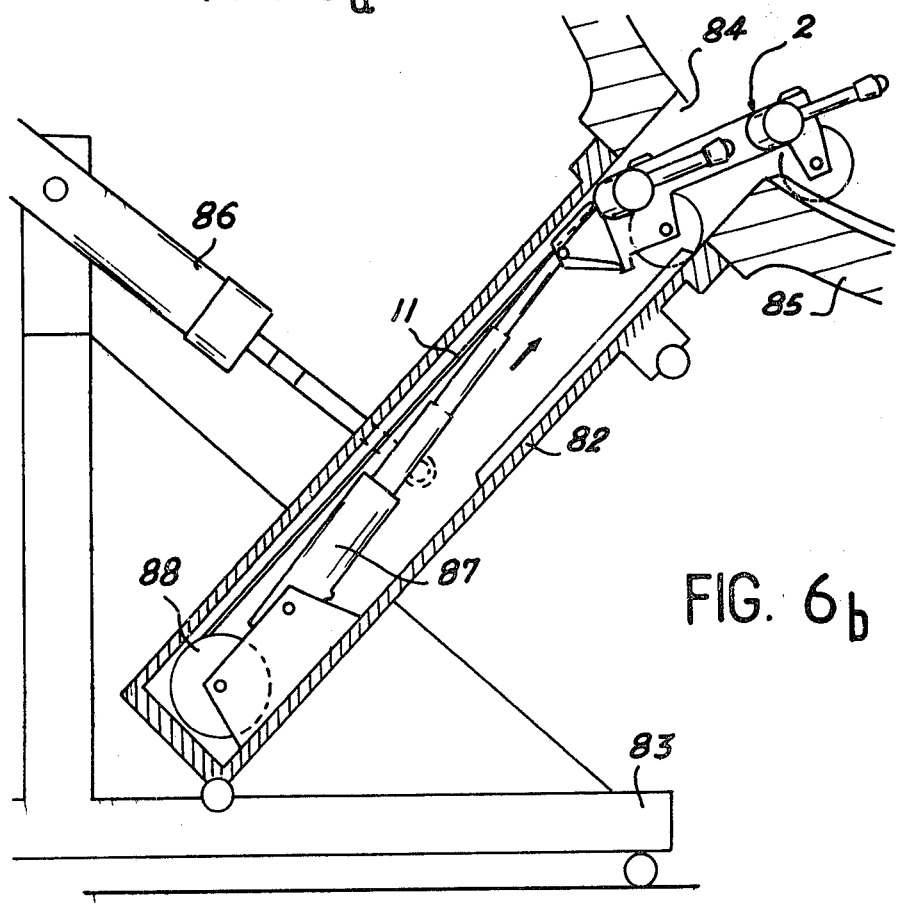
Figure 6C:
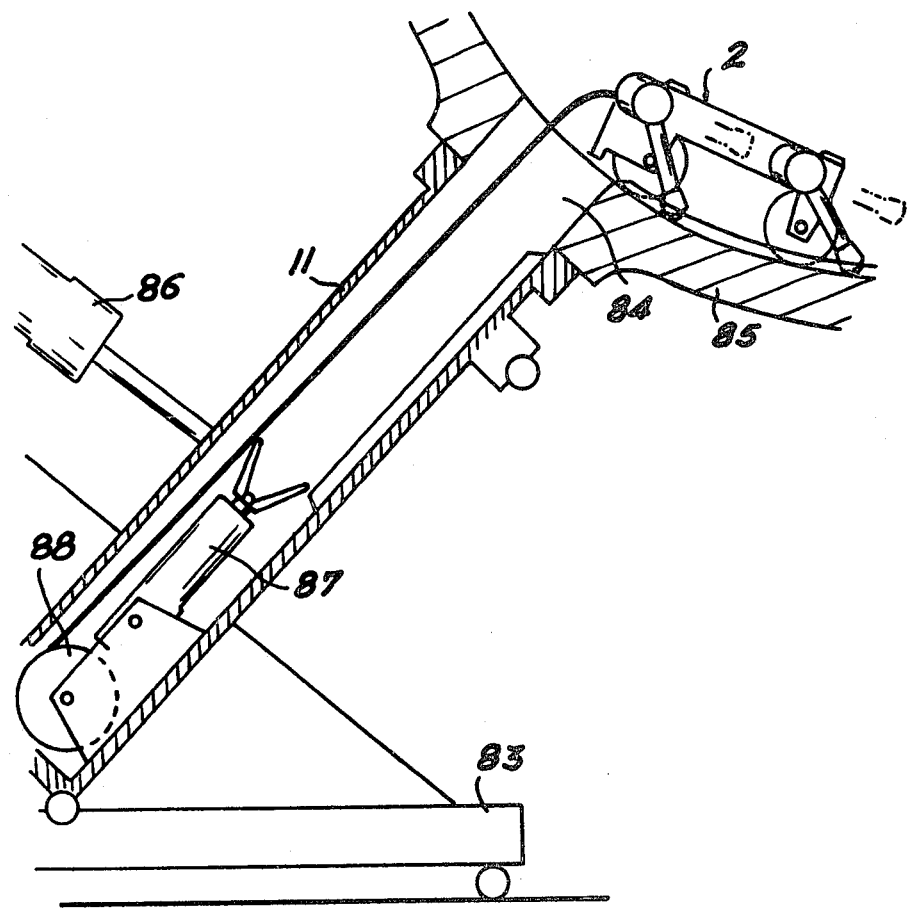
Figure 6D:
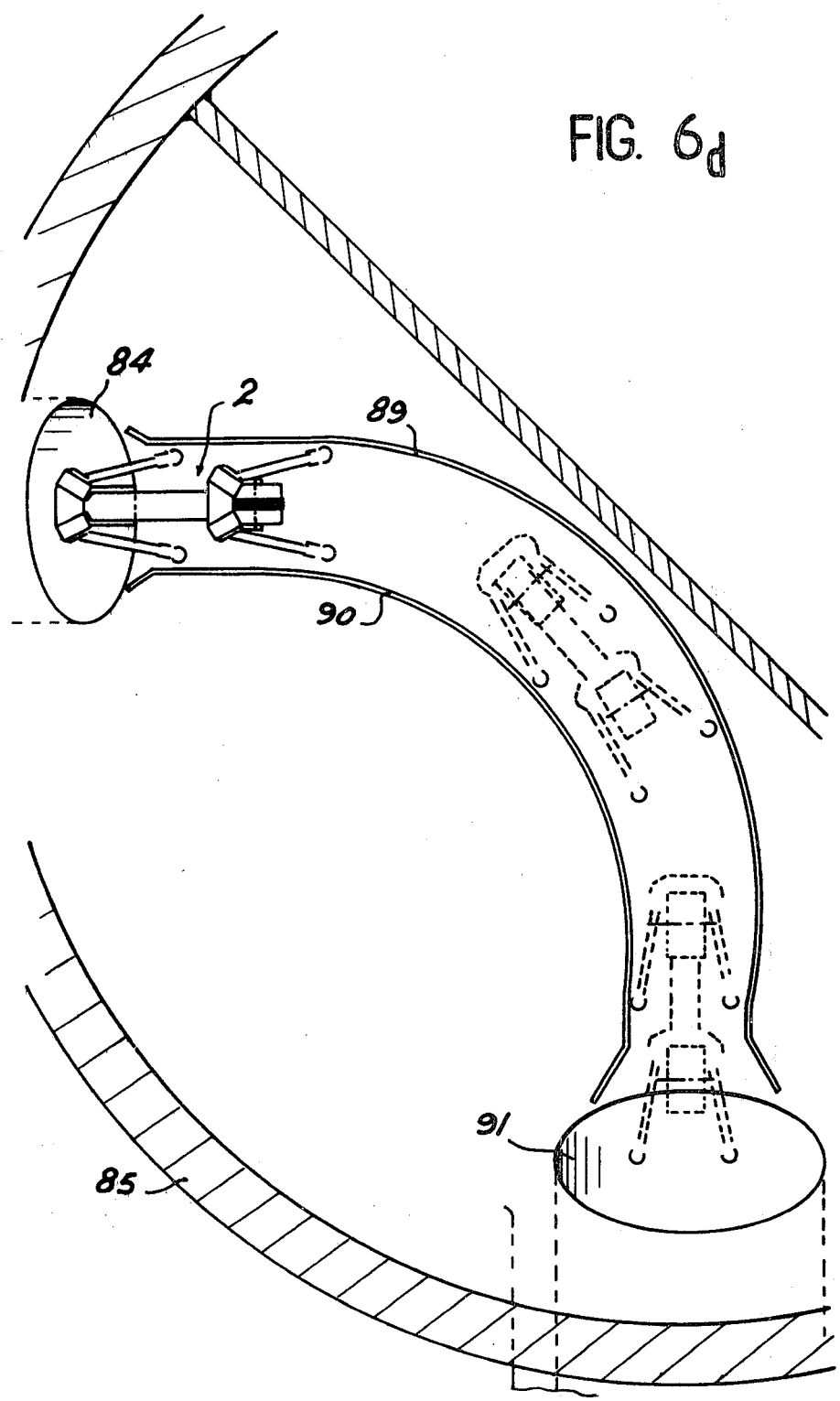

Thus, FIGS. 6a, 6b, 6c show how the vehicle can be introduced into the bottom chamber of a steam generator. In FIG. 6a reference numeral 82 designates the container of the vehicle which, by means of a support trolley 83, can be brought up to a manhole 84 in a water tank of a steam generator 85. In FIG. 6b a jack 86 permits the positioning of container 82 in front of manhole 84 which pushes the vehicle 2, arm frontwards, to introduce it into water tank 85, control cable 11 being wound off a reel 88. In FIG. 6d the arms are lowered and the vehicle moves towards the entrance to the pipe. Finally in FIG. 6 in plan view it is possible to see the vehicle guided by ramps 89 and 90 towards the opening 91 of the pipe to be investigated.

Figure 7:
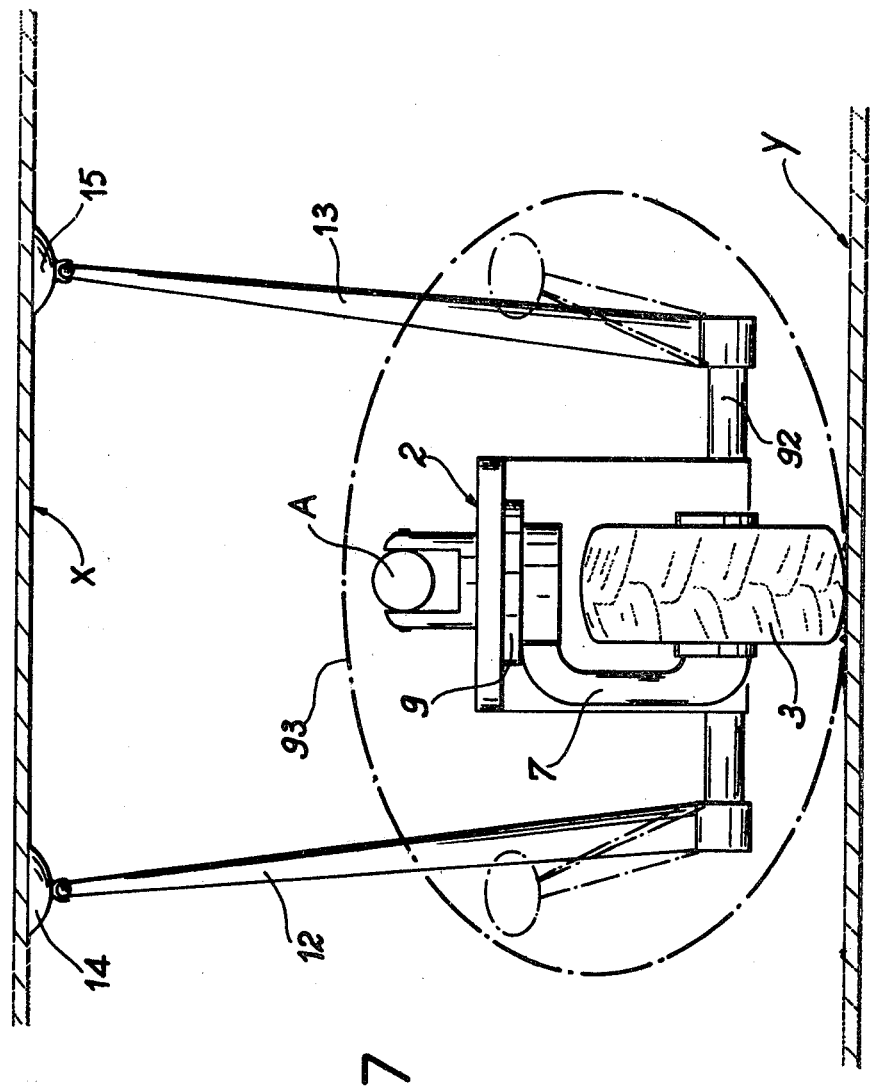
FIG. 7 a further contructional variant of the self-propelled vehicle according to the invention, more particularly suitable for the movement of the vehicle within a laminar space defined by two substantially planar and not strictly parallel walls.

Finally FIG. 7 illustrates another constructional variant of the self-propelled vehicle with articulated arms according to the invention. In this case it is especially designed for moving in a laminar space defined between two approximately parallel surfaces X and Y, instead of within a tubular member. This drawing shows the articulated arms 12, 13 associated with the driving and guide wheel 3, which if desired can be a single wheel only. In this case arms 12 and 13 are articulated to a transverse spindle 92 which is displaced downwards relative to body 2. This displacement of the articulation axis of the arms makes it possible, with a reasonable torque, to obtain a large, elastic bearing force, whilst permitting the vehicle to adapt to local variations in the distance between surfaces X and Y. In the same way as previously relative to a tube the vehicle according to the invention is able to pass through narrow passages corresponding to manholes or the like, as diagrammatically indicated on the drawing by the mixed line 93, the articulated arms being shown swung along the body, as shown by mixed lines. In the same way as hereinbefore the reaction of the articulated arms on the facing walls makes it possible, on the basis of an adequate torque, to ensure a suitable reaction pressure on the driving wheels, whilst ensuring the adhesion of the vehicle even to a vertical wall. Thus, as hereinbefore, the vehicle has two degrees of freedom in its displacement in the lamina space, whereby the latter can be constant or variable. Finally and as in the first variants preference is given to the use of sliding shoes with fluid cushions, spheres on fluid cushions or balls or finally to orientable wheels.

As stated hereinbefore and no matter what variant is used the articulated arms can be realised by means of a telescopic assembly which ensures in the folded-up position even smaller overall dimensions of the vehicle. Moreover this solution has the advantage of only requiring a single pneumatic action to obtain at the same time the extension of the telescopic jacks in several sections constituting for example each of the arms and the bearing on the air cushions or on the spherical members of the terminal sliding bearing members. Moreover if there is only a single supply of the jack and the air cushions the absence of sliding due to the use of these cushions limits to a negligible value the bending stresses applied to the telescopic arms, provided that said arms are positioned in accordance with the radii of the tube or perpendicular to the walls.

The invention is not limited to the embodiments described and represented hereinbefore and various modifications can be made thereto without passing beyond the scope of the invention.

What is claimed is:

1. A self-propelled vehicle with articulated arms comprising:
    (a) a vehicle body having a longitudinal plane of symmetry,
    (b) at least one wheel which drives and steers the vehicle, the wheel being mounted on said body and having an individual pivoting axis and an individual steering axis, said steering axis being located in the vicinity of said longitudinal plane, the at least one wheel being adapted to roll on a first surface, the distance between said body and said at least one pivoting axis being fixed,
    (c) at least one pair of pivoting arms carried by said body, each arm of said pair being located on one side of said longitudinal plane, each arm of said pair terminating in a supporting member, which supporting member is adapted to slide or roll on a second surface, the second surface being opposite to said first surface,
    (d) means carried by said vehicle for transmitting individually a pivoting torque to each of said arms, such pivoting torque resulting in an arm rotating and contacting, at the terminating support member of the arm, the second surface, whereby the reaction between the second surface and the support member results in a contact force between the wheel associated with said pair of arms and the first surface to thereby assist the self-propelled vehicle in traversing a bend in the first and second surfaces, and to compensate for variations in shape of the first and second surfaces.

2. A self-propelled vehicle according to claim 1, wherein each supporting bearing member has a fluid cushion device which is adapted to to prevent direct mechanical contact with the first surface.

3. A self-propelled vehicle according to claim 2, wherein each articulated arm supporting member includes a sphere on which is mounted, with a clearance, a shoe which carries a flexible skirt which bears on the second surface, each arm having axially therein a bore for for supplying pressurized fluid creating a fluid cushion in the shoe, skirt and second surface.

4. A self-propelled vehicle according to claim 3, wherein the shoe is provided with a device for the frictional bearing against the second surface in the case of an overpressure of the pressurized fluid for bringing about the jamming of the arm relative to the second surface.

5. A self-propelled vehicle according to claim 2, wherein each articulated arm support member has a socket which receives with a clearance a sphere which bears on the second surface forming a swivel, and an axial bore for supplying a pressurized fluid to the gap between the sphere and the socket.

6. A self-propelled vehicle according to claim 1, wherein each support member includes a sphere mounted on smaller balls in a recess in a ball cap, said sphere adapted to roll against the second surface.

7. A self-propelled vehicle according to claim 1, including stirrups disposed in front of and behind the wheel, to thereby permit the passage of said wheel to the right of an orifice in the second surface on which it moves, the stirrups each having a diameter greater than that of the wheel.

8. A self-propelled vehicle according to claim 1, wherein the pivoting arms are articulated in pairs on the said body about a common axis transverse to the longitudinal axis of the body.

9. A self-propelled vehicle according to claim 1, wherein the arms are articulated singly on the body about axes which form with the vehicle longitudinal axis a given angle, said axes being symmetrical to one another relative to the said plane of symmetry of the body.

10. A self-propelled vehicle according to claim 9, wherein the articulated arms form with their pivot axis an angle which is at the most equal to the angle of said pivot axis with the said longitudinal axis of the vehicle body.

11. A self-propelled vehicle according to claim 8, wherein the common transverse articulation axis of each arm is displaced towards the lower part of the said body in order to permit, with said arm lowered, minimum heightwise dimensions of the vehicle.

12. A self-propelled vehicle according to claim 1, wherein the first and second surfaces are defined by two diametrically opposite regions of the wall of a tube.

13. A self-propelled vehicle according to claim 1, wherein the first and second surfaces are substantially parallel and hence define between them a laminar space.

14. A self-propelled vehicle according to claim 1, wherein the articulated arms each are telescoping arms with control jacks to extend and retract them.

15. A self-propelled vehicle with articulated arms comprising:
(a) a vehicle body having a longitudinal plane of symmetry,
(b) at least one wheel which drives and steers the vehicle, the wheel being mounted on said body and having an individual pivoting axis and an individual steering axis, said steering axis being located in the vicinity of said longitudinal plane, the at least one wheel being adapted to roll on a first surface, the distance between said body and said at least one pivoting arm being fixed,
(c) two pairs of pivoting arms carried by said body, said pairs being spaced along said vehicle body from each other, each arm of each of said spaced pair being located on one side of said longitudinal plane, each arm of each of said pairs terminating in a supporting member, which supporting member is adapted to slide or roll on a second surface, the second surface being opposite to said first surface,
(d) means carried by said vehicle for transmitting individually a pivoting torque to each of said arms, such pivoting torque resulting in an arm rotating and contacting, at the terminating support member of the arm, the second surface, whereby the reaction between the second surface and the support member results in a contact force between the wheel associated with said arms and the first surface to thereby assist the self-propelled vehicle in traversing a bend in the first and second surfaces, and to compensate for variations in shape of the first and second surfaces.

* * * * *